United States Patent
Yang et al.

(10) Patent No.: US 7,633,555 B2
(45) Date of Patent: Dec. 15, 2009

(54) METHOD AND DEVICE FOR AUTOMATIC COLOR CORRECTION

(75) Inventors: Kung-Tsun Yang, Tucheng (TW); Wei-Kuo Lee, Zhubei (TW); Yun-Hong Shen, Hsinchu (TW)

(73) Assignee: MStar Semiconductor, Inc., Hsinchu County (TW)

( * ) Notice: Subject to any disclaimer, the term of this patent is extended or adjusted under 35 U.S.C. 154(b) by 869 days.

(21) Appl. No.: 11/224,975

(22) Filed: Sep. 14, 2005

(65) Prior Publication Data

US 2006/0087590 A1    Apr. 27, 2006

(30) Foreign Application Priority Data

Oct. 21, 2004    (TW) .............................. 93131913 A (51) Int. Cl.
*H04N 9/64*    (2006.01)

(52) U.S. Cl. ....................... 348/577; 348/645; 348/649; 348/650

(58) Field of Classification Search ......... 348/649–650, 348/652, 664, 624, 577, 655, 223.1, 645–647, 348/679; *H04N 9/64*
See application file for complete search history.

(56) References Cited

U.S. PATENT DOCUMENTS

| | | | | |
|---|---|---|---|---|
| 5,530,474 A | * | 6/1996 | Takei | 348/224.1 |
| 5,712,691 A | * | 1/1998 | Brennesholtz | 348/744 |
| 5,874,988 A | * | 2/1999 | Gu | 348/97 |
| 7,352,409 B2 | * | 4/2008 | Ueki | 348/649 |
| 7,405,771 B2 | * | 7/2008 | Lee et al. | 348/645 |
| 7,460,181 B2 | * | 12/2008 | Luu et al. | 348/649 |

* cited by examiner

*Primary Examiner*—Trang U Tran
(74) *Attorney, Agent, or Firm*—WPAT, PC; Justin King (57) ABSTRACT

A method and a device for automatic color correction by defining an operation window, a target window, and an active region bounded by the preceding windows so as to adjust chroma values in the active region. Correction of chroma signals is associated with a window region rather than a certain point. Besides, the present invention provides correction of the chroma signals so as to prevent image discontinuity and disharmony.

19 Claims, 9 Drawing Sheets

METHOD AND DEVICE FOR AUTOMATIC COLOR CORRECTION

BACKGROUND OF THE INVENTION

1. Field of the Invention

The present invention generally relates to a method and a device for automatic color correction and, more particularly, to a method and a device for automatic color correction by using an operation window and a target window.

2. Description of the Prior Art

With the arrival of the digital era, digital information products are replacing analog products. One example is that the digital TV gradually replaces the traditional analog TV. Meanwhile, the video information is recorded and distributed by digital media instead of traditional tapes. Consequently, the quality of digital images has become a major issue in the industry.

The digital image is recorded in pixels. The colors of each pixel associated with its brightness and chromaticity, are seen as various combinations of the so-called primary colors, red (R), green (G), and blue (B). Moreover, the quality of digital images primarily depends on the brightness, contrast, and chromaticity of the whole picture.

As for digital image processing, the prior art converts RGB signals into luminance (Y) and chroma (U and V) signals, and then adjusts these signals to increase the brightness, contrast, and chromaticity of digital images.

Taking correction of chroma signals for example; a conventional method for adjusting chroma signals lies in the automatic correction of chroma signals in a region where its chroma is insufficient in the image picture. Besides, the chroma values are adjusted to converge at the center of the region automatically so as to present the picture more vividly and display required color tones.

In the prior art method, although the chroma signals in a region where its chroma are insufficient can be automatically adjusted to converge at the center of the region, this simple approach leads to other problems in that the adjusted picture tends to monochrome and causes disharmony in the chroma between adjacent regions.

Therefore, there is need in providing a method and a device for automatic color correction such that the chrominance of the video can be adjusted automatically, and the adjusted image frame looks continuous and harmonious in chroma between adjacent regions.

SUMMARY OF THE INVENTION

It is a primary object of the present invention to provide a method and a device for adjusting the picture region of a digital image such that the adjusted picture can be continuous in chroma between adjacent regions.

In order to achieve the foregoing object, the present invention provides a method for automatic color correction, comprising steps of: constructing an operation window and a target window in said operation window on a plane coordinate system with two coordinate axes associated with a first and a second chroma signals; determining whether the first and the second chroma values of said image point are located between said operation window and said target window; and adjusting said first and said second chroma values of said image point according to said target window if said first and said second chroma values of said image point are located between said operation window and said target window.

The present invention further provides a device for automatic color correction, comprising: a comparative apparatus, receiving an operation window signal, a target window signal, a first chroma signal, and a second chroma signal so as to output a first comparative signal and a second comparative signal; a logic gate, receiving said first comparative signal and said second comparative signal so as to output a control signal; and a mapping value calculator, receiving said first chroma signal, said second chroma signal, and said control signal so as to generate a third chroma signal and a fourth chroma signal.

BRIEF DESCRIPTION OF THE DRAWINGS

FIG. 6 includes FIGS. 6(A), 6(B) and 6(C), wherein

DETAILED DESCRIPTION OF THE INVENTION

Figure 1:
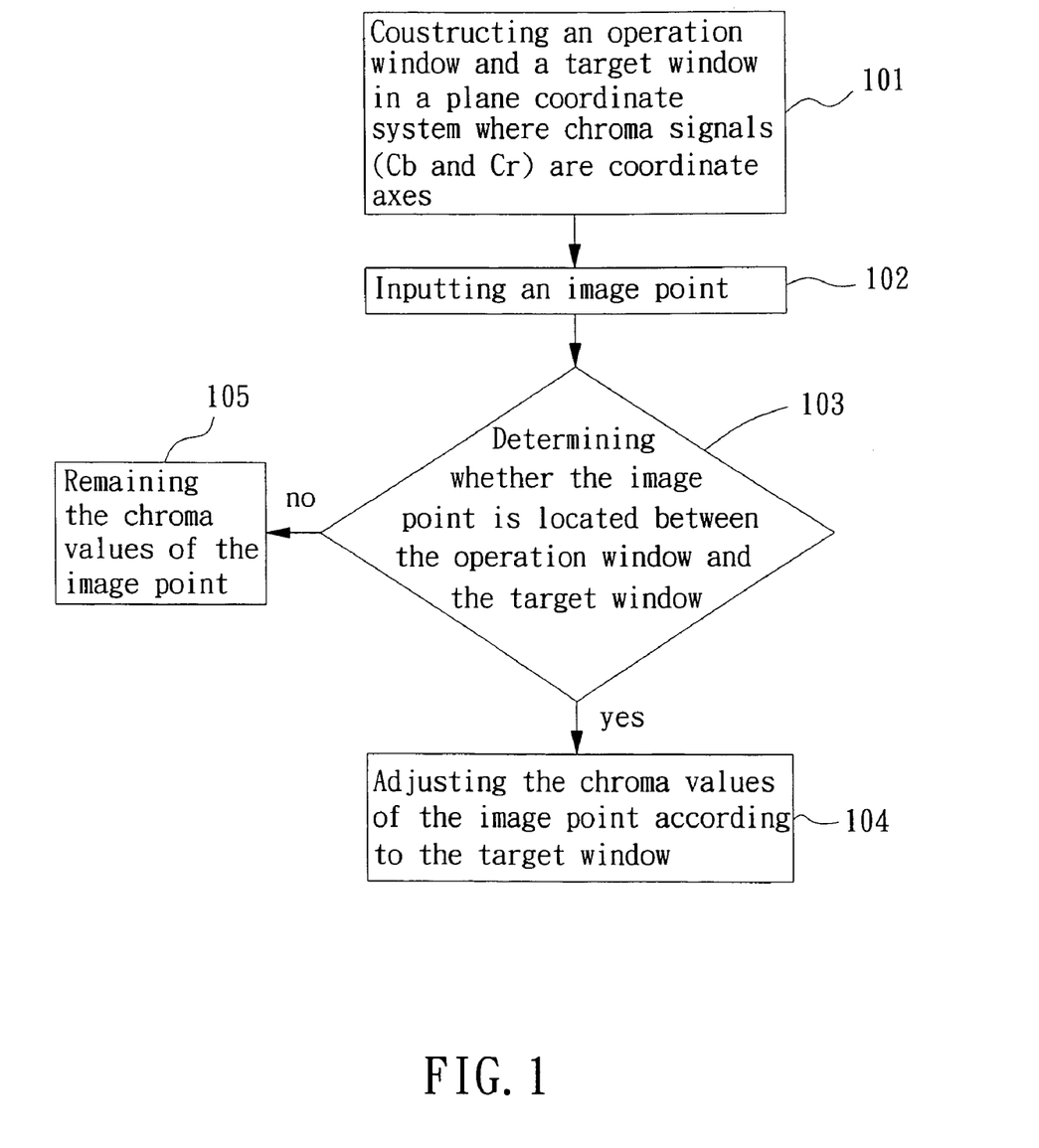
FIG. 1 is a flow chart showing a method for automatic color correction in accordance with the preferred embodiment of the present invention.

The present invention providing a method and a device for automatic color correction can be exemplified by the preferred embodiment as described hereinafter:

Please refer to FIG. 1, which is a flow chart showing a method for automatic color correction in accordance with the preferred embodiment of the present invention. At first, an operation window and a target window within the operation window are constructed on the plane coordinate system where chroma signals (Cb and Cr) are coordinate axes, as described in Step 101.

Figure 5:
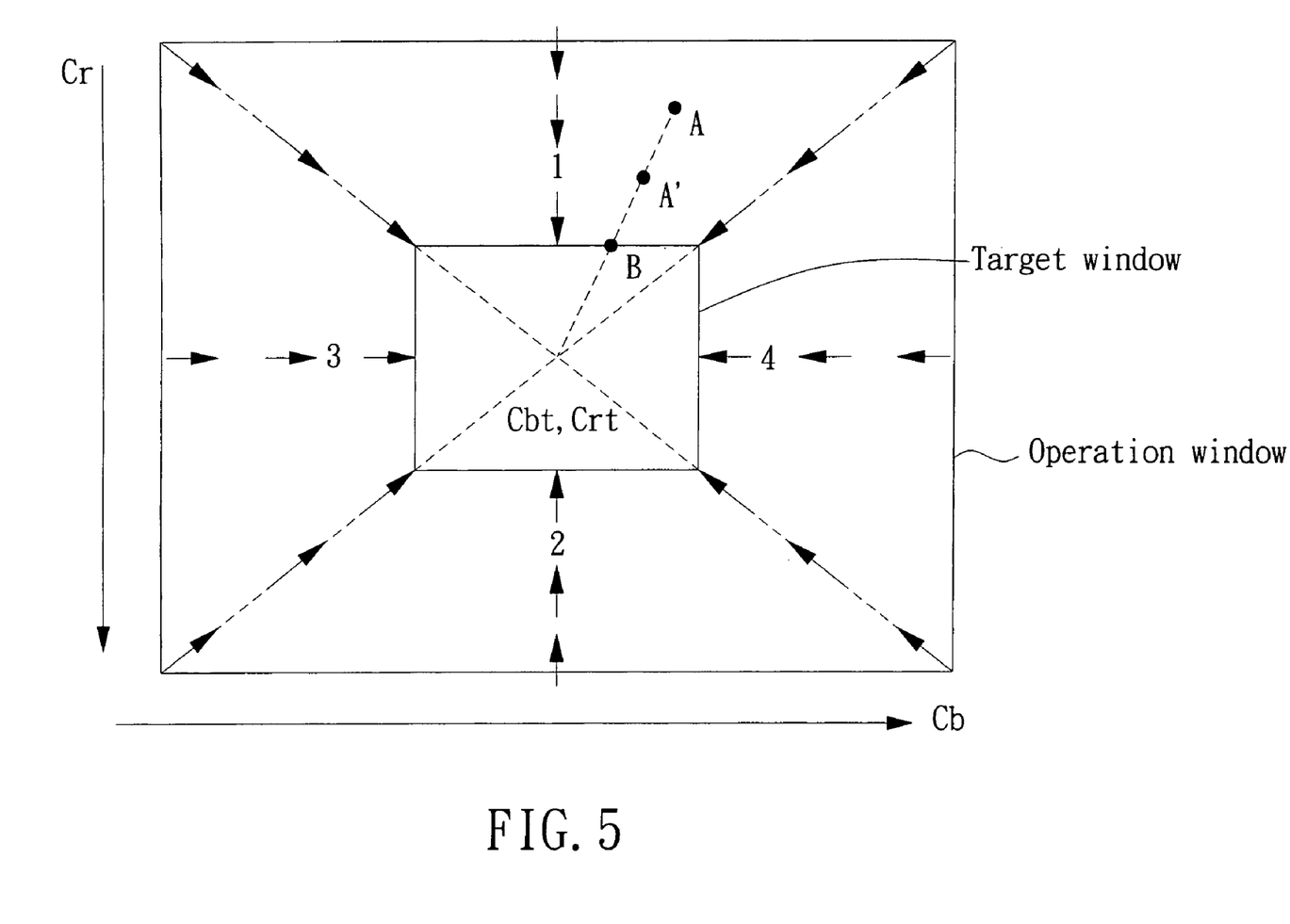
FIG. 5 is a diagram showing the coordinate location of a point and a mapping point on the target window in accordance with the preferred embodiment of the present invention.
Figure 6A:
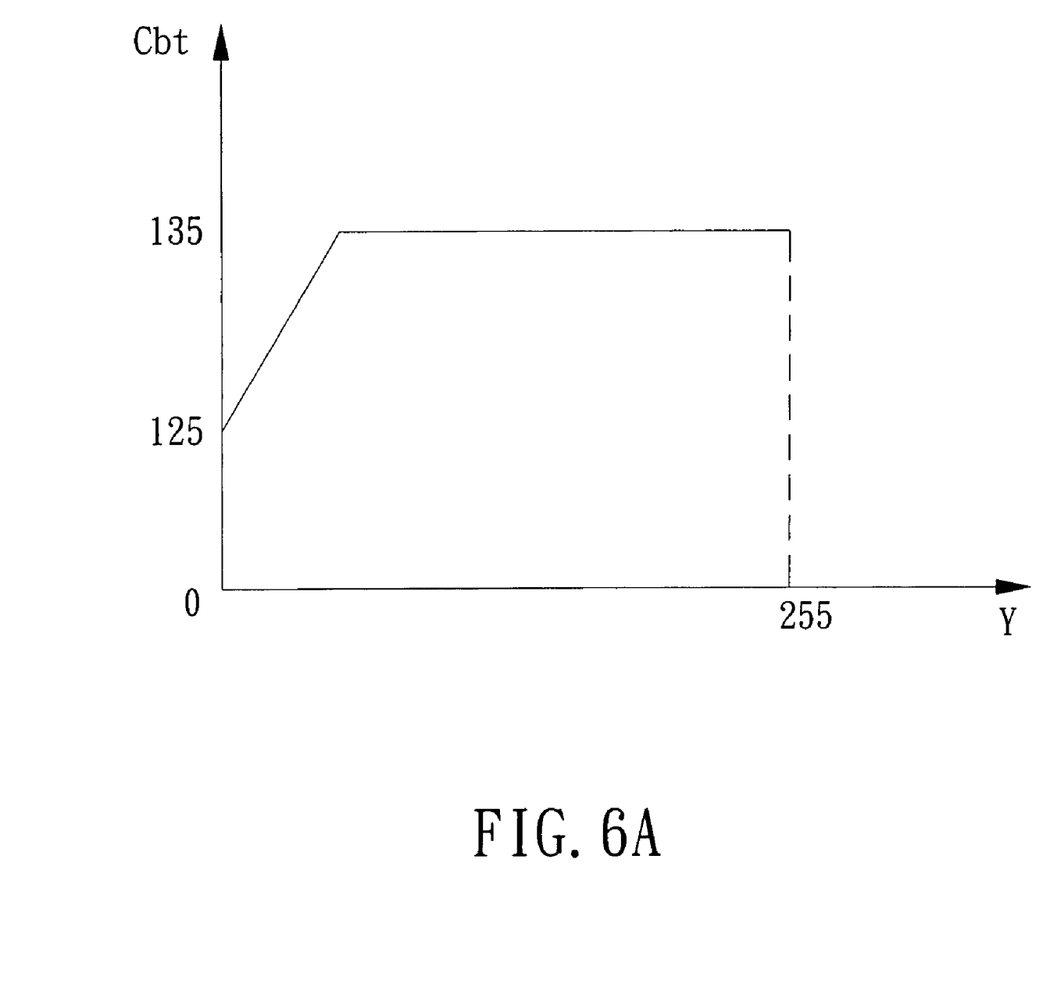
FIGS. 6(A) and 6(B) show exemplary mapping curves for (Cbt, Crt) which associate with input luminance level Y.
Figure 6B:
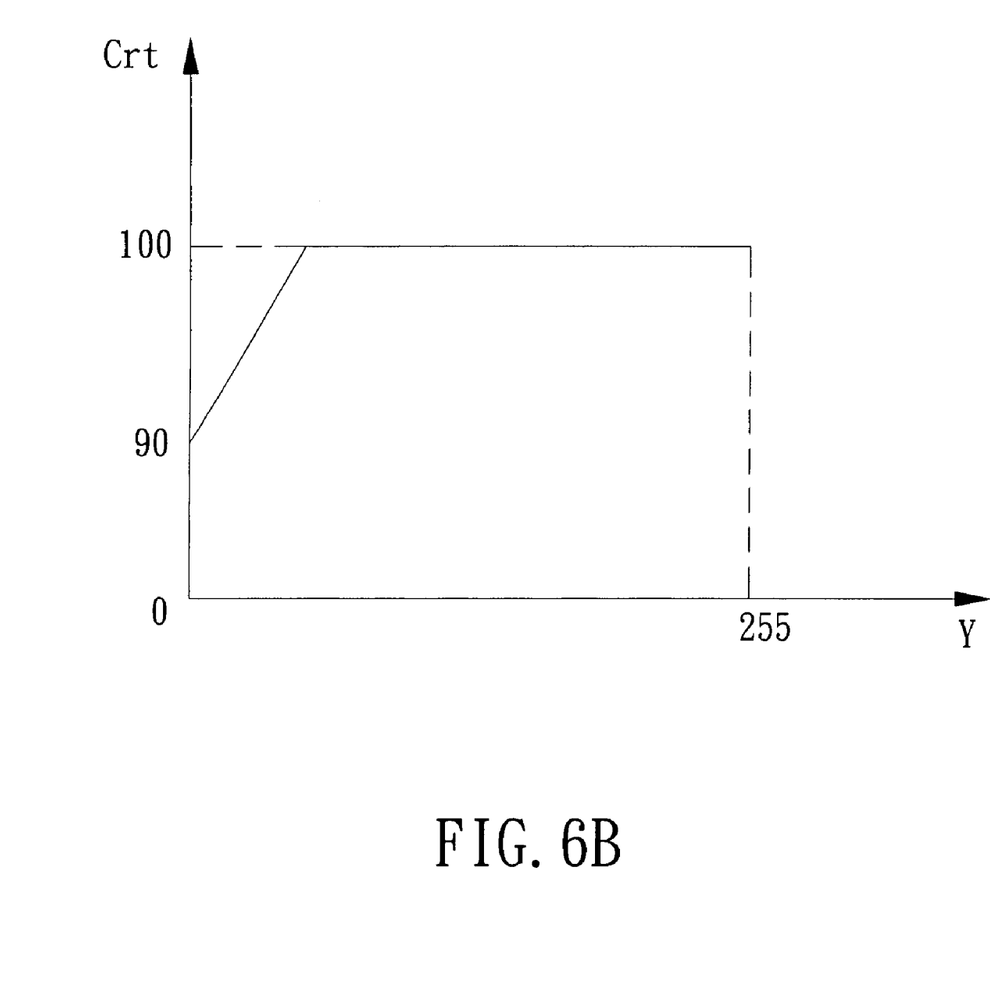

Then, information of an image point is inputted, as described in Step 102, and thereby determining whether the chroma values of the image point on the plane coordinate system are located between the operation window and the target window, as described in Step 103. The chroma values of the image point are adjusted according to the target window if the image point is located between the operation window and the target window, as described in Step 104; otherwise, the chroma values of said image point are remained unadjusted, as described in Step 105. The adjusting equation is expressed as $$(Cba', Cra') = (Cba, Cra) + \text{Gain} \times [(Cbb, Crb) - (Cba, Cra)]$$

where coordinates (Cba', Cra') are the chroma values of the adjusted image point and coordinates (Cba, Cra) are the chroma values of the image point before adjusting. Gain is preferably a constant smaller than 1 and (Cbb, Crb) is the coordinate of a reference point B. If the location of the chroma value of the adjusted image point is located in region 1 in FIG. 5, the location of B point in FIG. 5 is expressed as $$Cbb=Cbt+(Cba-Cbt)/(Cra-Crt)\times Crd2$$

and $$Crb=Crt+Crd2$$

wherein Crd2 is half the side-length of the square target window and coordinates (Cbt, Crt) is the center of the target window. Furthermore, (Cbt, Crt) is preferably dependent on input luminance level as:

$$Cbt=Cbt\_M(index)*(1-alpha)+Cbt\_M(index+1)*alpha.$$

$$Crt=Crt\_M(index)*(1-alpha)+Crt\_M(index+1)*alpha.$$

wherein Cbt_M(index) and Crt_M(index) are preferably determined by look-up table (LUT), and index can be decided by the input luminance level. Alpha represents the interpolation coefficient, so as the look-up table hardware can be implemented in lower resolution. (Cbt, Crt) can be obtained from (Cbt_M(index), Cbt_M(index+1)) at the lower resolution through interpolation. FIGS. 6(A) and 6(B) show exemplary mapping curves for (Cbt, Crt) which associate with input luminance level Y.

The location of the adjusted image point in the region 4 as described in FIG. 5 is expressed as $$Cbb=Cbt+Crd2$$

and $$Crb=Crt+(Cra-Crt)/(Cba-Cbt)\times Crd2.$$

Similarly, the mapping reference coordinate can be calculated while the adjusted image point is located somewhere else.

Although this invention has been disclosed and illustrated with reference to particular embodiment, the principles involved are susceptible for use in numerous other embodiments that will be apparent to persons skilled in the art. This invention is, therefore, to be limited only as indicated by the scope of the appended claims.

Figure 2:
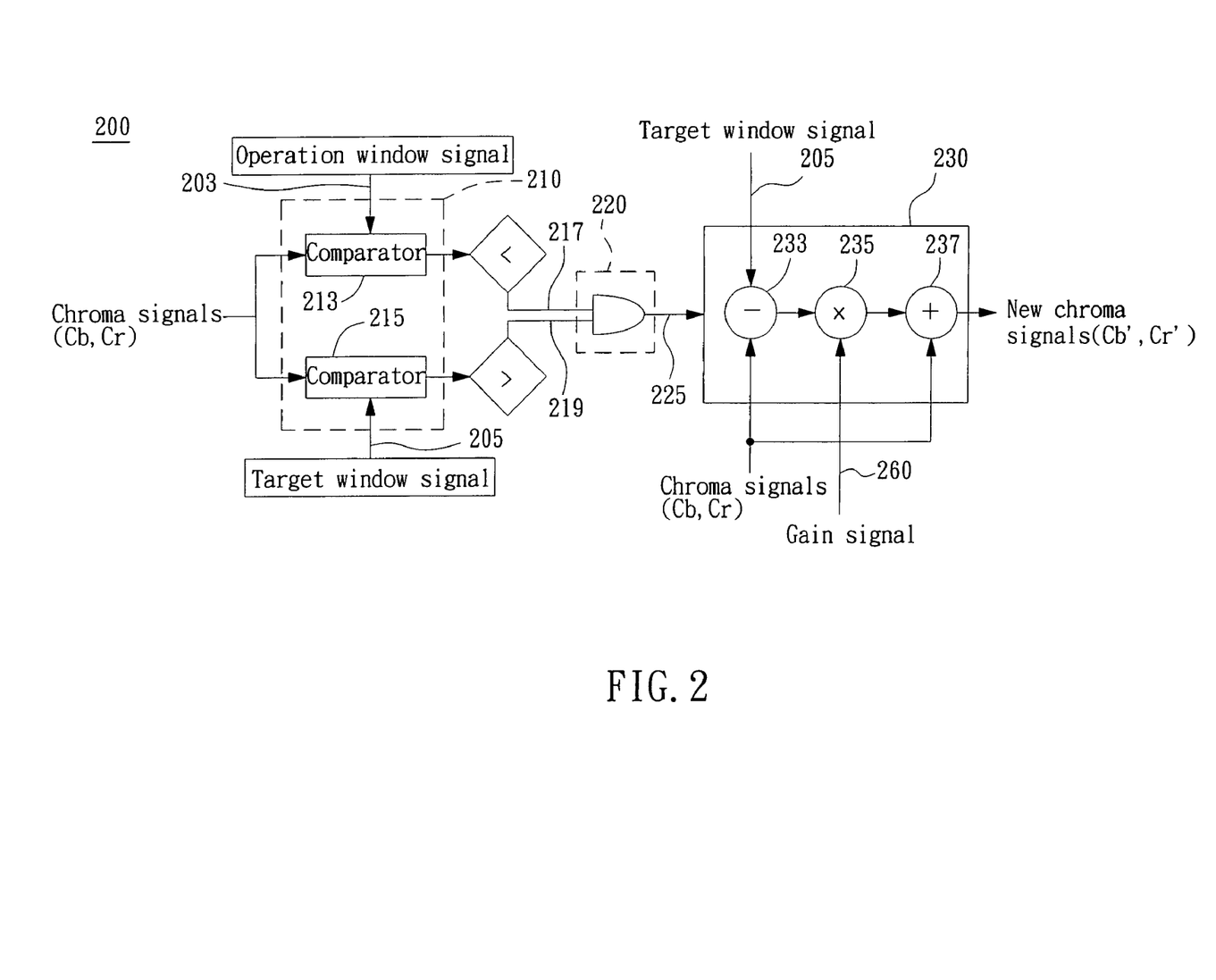
FIG. 2 is a diagram showing a device for automatic color correction in accordance with the preferred embodiment of the present invention.

Please refer to FIG. 2, which is a diagram showing a device for automatic color correction in accordance with the preferred embodiment of the present invention. The device 200 for automatic color correction comprises a comparative apparatus 210, a logic gate 220, and a mapping value calculator 230. The comparative apparatus preferably comprises comparators 213 and 215. The mapping value calculator 230 preferably comprises a subtractor 233, a multiplier 235, and an adder 237.

The device 200 for automatic color correction receives and adjusts the chroma signals ($Cb_{in}$ and $Cr_{in}$) of one point by using active windows so as to get new chroma signals ($Cb_{out}$ and $Cr_{out}$). The device 200 for automatic color correction determines the window region of chroma signals ($Cb_{in}$ and $Cr_{in}$) respectively through the comparators 213 and 215 of the comparative apparatus 210 so as to output signals of comparative result 217 and 219. Besides, the device 200 determines whether the chroma signals ($Cb_{in}$ and $Cr_{in}$) are located in the area between the operation window and the target window, which are constructed by the user. The correction for the gain of chroma signals ($Cb_{in}$ and $Cr_{in}$) in vector form is processed through the logical gate 200 for controlling the signal 225 to activate the mapping value calculator 230, so as to obtain new chroma signals ($Cb_{out}$ and $Cr_{out}$) if the chroma signals ($Cb_{out}$ and $Cr_{out}$) are located between the operation window and the target window.

Figure 3:
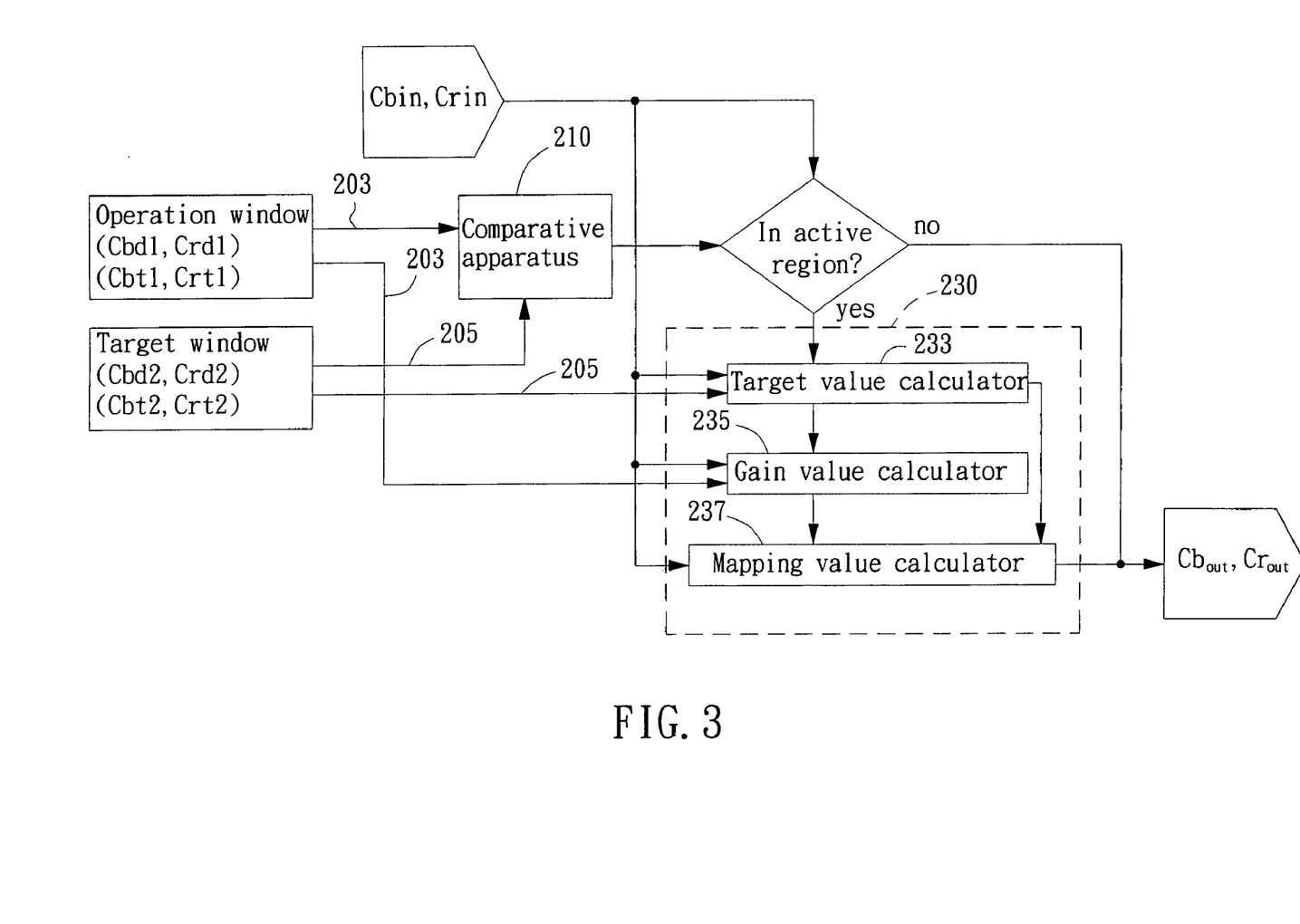
FIG. 3 is a functional block diagram of a device for automatic color correction in accordance with the preferred embodiment of the present invention.
Figure 4A:
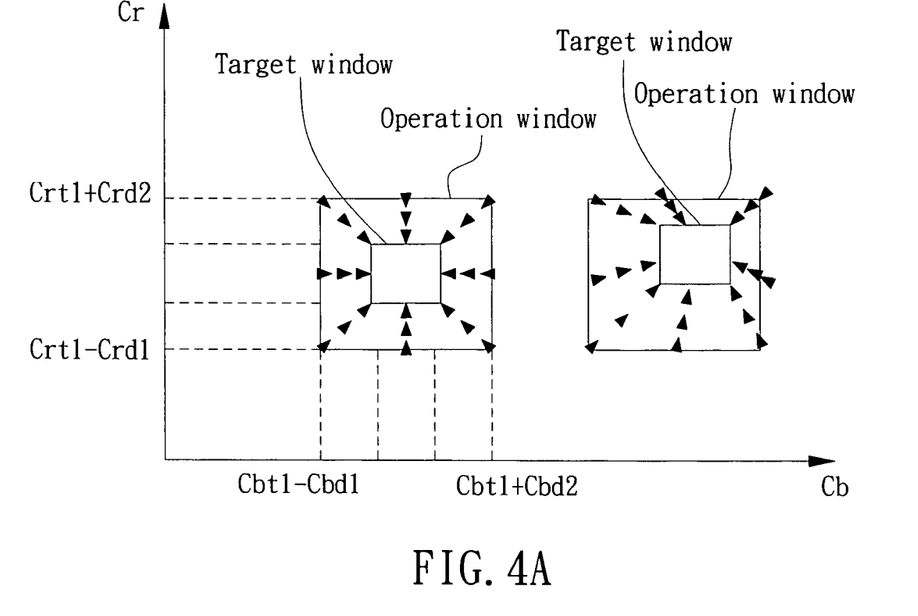
FIGS. 4A to 4D are diagrams showing the operation window and the target window in accordance with the preferred embodiment of the present invention.
Figure 4B:
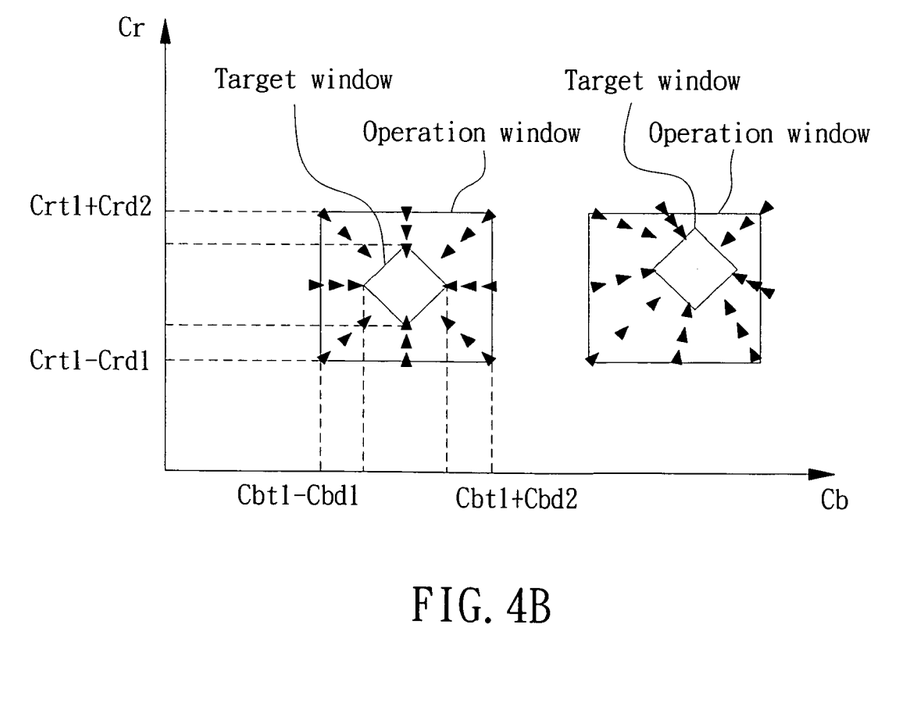
Figure 4C:
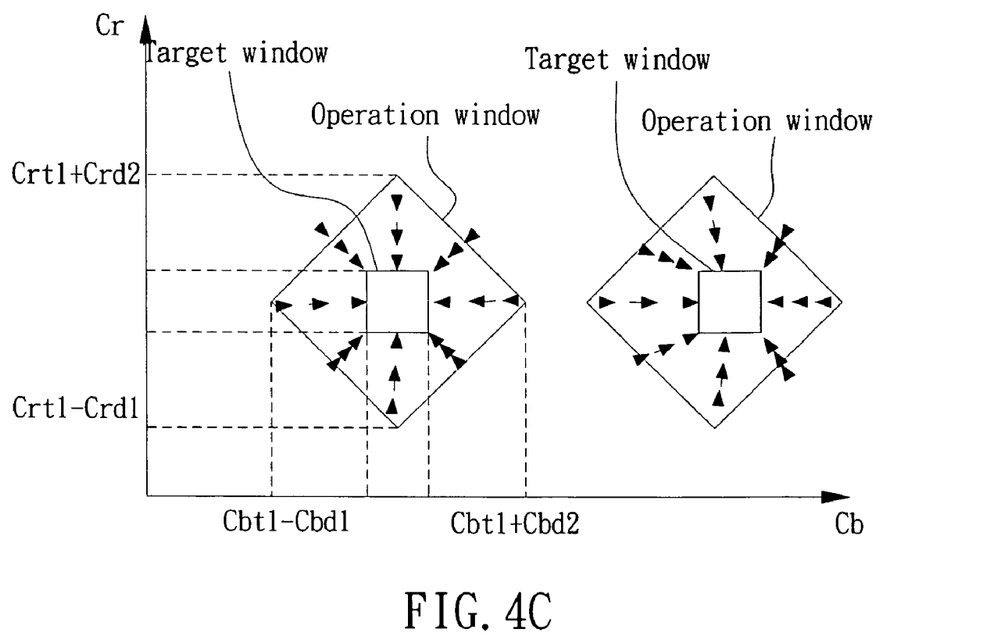
Figure 4D:
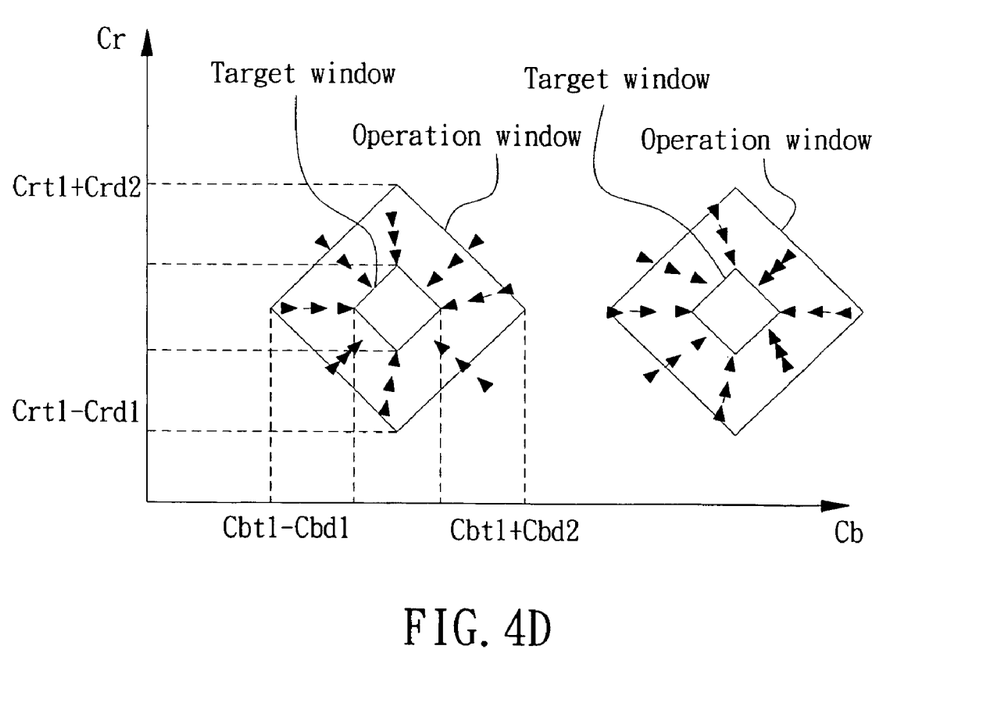

Please refer to FIG. 3, which is a diagram showing a device for automatic color correction in accordance with the preferred embodiment of the present invention. At first, a plurality of points are chosen on the plane coordinate system where Cb and Cr are the coordinate axes, and thereby defining an operation window ((Cbd1, Crd1), (Cbt1, Crt1)) and a target window ((Cbd2, Crd2), (Cbt2, Crt2)) as an operation window signal 203 and a target window signal 205 where the target window is preferably associated with the input luminance level, received by the comparative apparatus 210 respectively. The comparative apparatus 210 can establish an active region bounded by the operation window 203 and the target window 205.

In the preferred embodiment of the present invention, the shape of the target window can be rectangular or rhomboidal, and the target window can be located at the center or somewhere else in the operation window. Please refer to FIGS. 4A to 4D, which are diagrams showing the operation window and the target window in accordance with the preferred embodiment of the present invention. Although the target window is preferably defined by two points on the plane coordinate, both the target window and the operation window can be, for example, rectangular or rhomboidal. Moreover, the target window is not restricted to be located somewhere in the operation window. Therefore, the chroma value of each point located in the region between the operation window and the target window is preferably closer to the boundary of the target window.

While the chroma values ($Cb_{in}$ and $Cr_{in}$) are inputted into the comparative apparatus 210, the positional relationship of the operation window and the target window can be determined by the comparators 213 and 215 so as to determine whether the chroma value on the plane coordinate is located in the active region.

If the image point is located in the active region bounded by the operation window and the target window, the mapping value calculator 230 is initiated by the logic gate 220, so as to adjust the chroma signal ($Cb_{in}$ and $Cr_{in}$). More particularly, a target value calculator 233 can be a subtractor 233 to receive chroma signals and the target window signal so as to calculate the vector between the coordinates of chroma signals and the mapping point of target window. Please further refer to FIG. 5, which is a diagram showing the point coordinate and corresponding point of the target window in accordance with the preferred embodiment of the present invention. If point A denotes the point coordinates of chroma value ($Cb_{in}$ and $Cr_{in}$) and the coordinates (Cbt, Crt) denote a point in the operation window. The corresponding point on the target window can be determined according to the intersection B of the target window and the line associated with point A and point (Cbt, Crt); that is, point B is the corresponding point of A on the target window. As for the correction of chroma value ($Cb_{in}$ and $Cr_{in}$) of point A, chroma value ($Cb_{in}$ and $Cr_{in}$) of point A is adjusted toward point B to the chroma value of point A', a re-drawn point of A, on the vector (B−A) preferably defined by the user.

Therefore, while target value calculator 235 figures out the vector (B−A), the vector (B−A) is multiplied by the gain value (Gain) represented by the gain signal 260 through the gain value calculator 235, preferably a multiplier 235. The relation between point A and point A' can express as $$A'=A+Gain\times(B-A).$$

The gain value preferably varies with the range of operation window in accordance with the preferred embodiment of the present invention. FIGS. 6(A) and 6(B) show exemplary mapping curves for (Cbt, Crt) which associate with input luminance level Y.

Figure 6C:
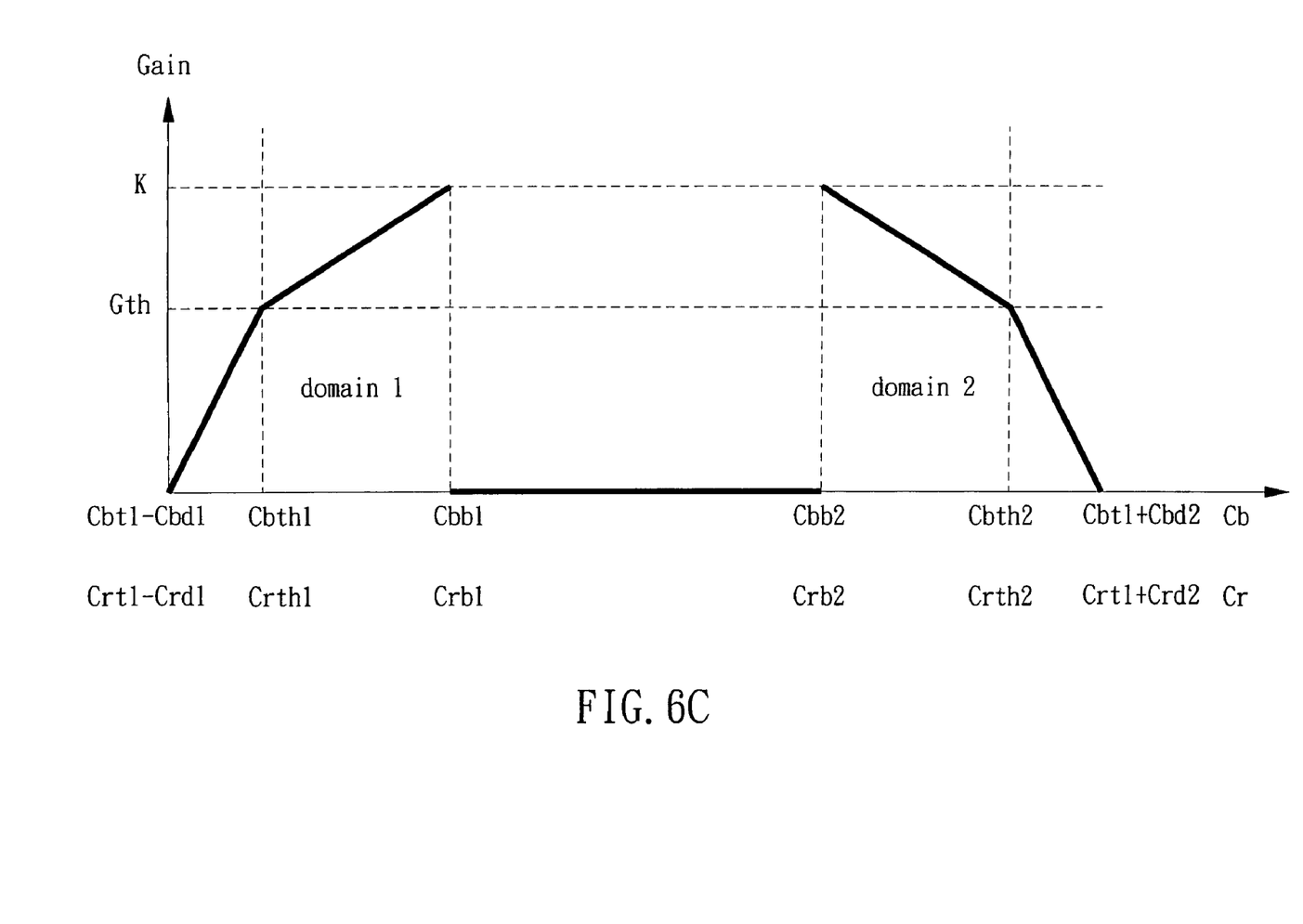
FIG. 6(C) is a graph showing the relationship between gain value and operation window in accordance with the preferred embodiment of the present invention.

Please refer to FIG. 6(C), which shows the relation between the gain value and the operation window. The gain value can be varied according to the range (domain 1 and domain 2) of the operation window and increases or decreases progressively in the form of a linear function. In FIG. 6(C), K denotes the maximum value of gain and Gth denotes the gain value of a turning point, to increase or decrease progressively with reference to Cbth1, Crth1, Cbth2, and Crth2, in the form of linear function. Moreover, the mapping value calculator 237 is preferably an adder 237 to obtain new chroma values ($Cb_{in}$ and $Cr_{in}$), i.e., the chroma value of point A'.

According to the above discussion, the present invention discloses a method and a device for automatic color correction by defining an operation window, a target window, and an active region that is preferably defined by preceding two windows so as to adjust the value of chroma signal in the active region. The correction of chroma signal is associated with a window region rather than a certain point. The present invention provides correction of the chroma signals so as to prevent image discontinuity and disharmony.

Although this invention has been disclosed and illustrated with reference to particular embodiment, the principles involved are susceptible for use in numerous other embodiments that will be apparent to persons skilled in the art. This invention is, therefore, to be limited only as indicated by the scope of the appended claims.

What is claimed is:

1. A method for automatic color correction, comprising steps of:
    constructing an operation window and a target window in said operation window on a plane coordinate system with two coordinate axes associated with a first chroma signal and a second chroma signal;
    determining whether a first chroma value and a second chroma value of an image point are located between said operation window and said target window; and
    adjusting said first and said second chroma values of said image point according to said target window only when said first and said second chroma values of said image point are located between said operation window and said target window.

2. The method for automatic color correction as recited in claim 1, wherein said first and said second chroma values of said image point are adjusted according to the location relationship between said image point and the boundary of said target window.

3. The method for automatic color correction as recited in claim 2, wherein said first and said second chroma values of said image point are adjusted according to the location relationship between said image point and a corresponding point on the boundary of said target window.

4. The method for automatic color correction as recited in claim 3, wherein said corresponding point on the boundary of said target window is determined according to an intersection of said target window and a line connected by said image point and a target point in said target window.

5. The method for automatic color correction as recited in claim 3, wherein said first and said second chroma values of said image point are adjusted according to the vector relationship between said image point and said corresponding point on the boundary of said target window.

6. The method for automatic color correction as recited in claim 5, wherein said image point, said corresponding point and said adjusted image point are denoted by A, B and A' respectively, and said adjusted image point A' is defined as:

$$A' = A + \text{Gain} \times (B - A)$$

where Gain is a gain coefficient.

7. The method for automatic color correction as recited in claim 6, wherein said gain coefficient varies within said operation window.

8. The method for automatic color correction as recited in claim 7, wherein said relationship between said gain coefficient and said operation window is defined by a look-up table (LUT).

9. The method for automatic color correction as recited in claim 7, wherein said relationship between said gain coefficient and said operation window is defined by a plurality of linear equations with different slopes on said plane coordinate system.

10. The method for automatic color correction as recited in claim 1, wherein said operation window is a rectangle or a rhombus.

11. The method for automatic color correction as recited in claim 1, wherein said target window is a rectangle or a rhombus.

12. The method for automatic color correction as recited in claim 1, wherein two points on said plane coordinate system respectively define said operation window and said target window.

13. The method for automatic color correction as recited in claim 1, wherein said target window is located at the center of said operation window.

14. The method for automatic color correction as recited in claim 1, wherein said target window is associated with an input luminance level of said image point.

15. A device for automatic color correction, comprising:
    a comparative apparatus, receiving an operation window signal, a target window signal, a first chroma signal, and a second chroma signal so as to output a first comparative signal and a second comparative signal;
    a logic gate, receiving said first comparative signal and said second comparative signal so as to output a control signal; and
    a mapping value calculator, receiving said first chroma signal, said second chroma signal, and said control signal so as to generate a third chroma signal and a fourth chroma signal.

16. The device for automatic color correction as recited in claim 15, wherein said comparative apparatus further comprises:
    a first comparator, receiving said first chroma signal, said second chroma signal, and said operation window signal so as to output said first comparative signal; and
    a second comparator, receiving said first chroma signal, said second chroma signal, and said target window signal so as to output said second comparative signal.

17. The device for automatic color correction as recited in claim 15, wherein said logic gate is an AND gate.

18. The device for automatic color correction as recited in claim 15, wherein said logic gate is a NAND gate.

19. The device for automatic color correction as recited in claim 15, wherein said mapping value calculator further comprises:
    a subtractor, receiving said first chroma signal, said second chroma signal, and said target window signal so as to output a vector signal;
    a multiplier, receiving said vector signal and a gain signal so as to output a gain vector signal; and
    an adder, receiving said first chroma signal, said second chroma signal, and said gain vector signal so as to output said third chroma signal and said fourth chroma signal.

* * * * *